United States Patent
Guionnet

(10) Patent No.: US 11,138,703 B2
(45) Date of Patent: Oct. 5, 2021

(54) DYNAMIC RANGE COMPRESSION METHOD

(71) Applicant: ATEME, Velizy Villacoublay (FR)

(72) Inventor: Thomas Guionnet, Rennes (FR)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 16/958,935

(22) PCT Filed: Dec. 21, 2018

(86) PCT No.: PCT/FR2018/053522
§ 371 (c)(1),
(2) Date: Jun. 29, 2020

(87) PCT Pub. No.: WO2019/129981
PCT Pub. Date: Jul. 4, 2019

(65) Prior Publication Data
US 2020/0342578 A1  Oct. 29, 2020

(30) Foreign Application Priority Data
Dec. 29, 2017 (FR) .................................. 1763357

(51) Int. Cl.
*G06T 5/00* (2006.01)
*G06T 5/50* (2006.01)

(52) U.S. Cl.
CPC ............... *G06T 5/009* (2013.01); *G06T 5/50* (2013.01); *G06T 2207/10016* (2013.01); *G06T 2207/20008* (2013.01); *G06T 2207/20208* (2013.01)

(58) Field of Classification Search
CPC ...................... H04N 19/85; G06T 2207/20208
See application file for complete search history.

(56) References Cited

U.S. PATENT DOCUMENTS

2007/0085931 A1*  4/2007  Guionnet ............... H04N 19/87
                                                                            348/701
2013/0163666 A1*  6/2013  Leontaris ............. H04N 19/186
                                                                            375/240.12

(Continued)

FOREIGN PATENT DOCUMENTS

| JP | 2005-284534 | 10/2005 |
| WO | WO 2013/067101 | 5/2013 |
| WO | WO 2014/012680 | 1/2014 |

OTHER PUBLICATIONS

International Search Report, PCT/FR2018/053522, dated Mar. 13, 2019.

(Continued)

*Primary Examiner* — Paulos M Natnael
(74) *Attorney, Agent, or Firm* — Nixon & Vanderhye

(57) ABSTRACT

Disclosed is a method for processing a video stream including a set of images liable to contain a transition effect, the method including the following steps: detecting a fade-type transition effect within the set of images of the video stream and, where appropriate, calculating minimum and maximum brightnesses LMIN and LMAX for each image of the set of images containing the fade; estimating minimum and maximum brightnesses EMIN and EMAX for all of the images not containing the detected transition effect; determining minimum and maximum brightnesses SMIN and SMAX for a standard dynamic range; calculating minimum and maximum brightnesses TMIN and TMAX depending on the minimum and maximum brightnesses LMIN, LMAX, EMIN, EMAX, SMIN and SMAX calculated and determined beforehand; transmitting the calculated minimum and maximum brightnesses TMIN and TMAX with a view to dynamic range compression.

20 Claims, 7 Drawing Sheets

(56) References Cited

U.S. PATENT DOCUMENTS

| | | | | |
|---|---|---|---|---|
| 2014/0226724 A1* | 8/2014 | Sorin | .................. | H04N 19/137 375/240.16 |
| 2016/0080716 A1* | 3/2016 | Atkins | ............... | H04N 5/44504 348/599 |
| 2018/0338104 A1* | 11/2018 | Pines | ...................... | G09G 5/00 |
| 2018/0350405 A1* | 12/2018 | Marco | .................. | H04N 9/8205 |
| 2020/0342578 A1* | 10/2020 | Guionnet | ................ | G06T 5/009 |

OTHER PUBLICATIONS

Erik Reinhard, Wolfgang Heidrich, Paul Debevec, Sumanta Pattanaik, Greg Ward, Karol Myszkowski, « High Dynamic Range Imaging », 2nd Edition, Morgan Kaufmann, May 25, 2010.

David Gommelet, Aline Roumy, Christine Guillemot, Michaël Ropert, Julien Le Tanou, « Gradient-Based Tone Mapping for Rate-Distortion Optimized Backward-Compatible High Dynamic Range Compression », IEEE transactions on Image Processing, Issue 99, Aug. 15, 2017.

Kiser, C., Reinhard, E., Tocci, M., & Tocci, N. « Real Time Automated Tone Mapping System for HDR Video », Proceedings of the IEEE International Conference on Image Processing (pp. 2749-2752). Piscataway, NJ, 2012.

SMPTE Technical Committee (TC) 10E SG on HDR Ecosystem, « High-Dynamic-Range (HDR) Imaging Ecosystem », Sep. 19, 2015.

Kunkel Timo, Atkins Robin, Chen Tao, Hulyalkar Samir N, Pytlarz Jaclyn Anne, « Graphics Blending for High Dynamic Range Video », Dolby Lab Licensing Corp, US2015256860 (A1)—Sep. 10, 2015.

R. Boitard, R. Cozot, D. Thoreau, K. Bouatouch, « Zonal Brightness Coherency for Video Tone Mapping », Signal Processing: Image Communication, 29(2), 229-246. doi:10.1016/j.image.2013.10.001.

ITU-R Recommendation BT.709 and ITU-R Recommendation BT.2100 (documents cited in the specification).

\* cited by examiner

FIG. 6

DYNAMIC RANGE COMPRESSION METHOD

CROSS-REFERENCE TO RELATED APPLICATIONS

This application claims priority benefit under 35 U.S.C. § 119(d) from French Patent Application No. 17 63357, filed Dec. 29, 2017, the disclosure of which is incorporated by reference herein in its entirety.

BACKGROUND OF THE INVENTION

Field of the Invention

The present subject disclosure relates to the field of image and video processing, more specifically to the processing of video brightness dynamic range. The subject disclosure relates to a method for processing a video stream containing a transition effect.

Description of the Related Art

The audiovisual sector is experiencing substantial growth. Indeed, following the development of high-definition television, ultra-high-definition television has arrived on the market. The gain in perceived quality brought about by the increase in resolution is starting to tail off. Consequently, much work is currently being carried out on video brightness dynamic range. There are two types of image-capture and -rendering technologies: a high-dynamic-range (HDR) technology and, by contrast, the standard-dynamic-range (SDR) technology. HDR makes it possible to represent a greater dynamic range than SDR.

The dynamic range of an image corresponds to a brightness range that can be represented. In order to determine such a dynamic range, the ratio of the highest brightness value to the lowest brightness value that can be represented is used. For example, in the case of a television screen with a dynamic range of 1000, the maximum brightness delivered may be 300 candelas per square meter and the minimum brightness delivered may be 0.3 candela per square meter. Standard televisions generally have a dynamic range of this order. The human eye has a total dynamic range of about $10^9$.

The development of high-dynamic-range technologies makes it possible to capture and render video content having a dynamic range that is as high as possible. This makes it possible to obtain an image render that exhibits more realism and a more natural appearance. The experience of a user viewing such video content is therefore improved.

There are already televisions equipped with high-dynamic-range technology on the market. The objective in the near future is to offer the public programs using this high-dynamic-range (HDR) technology for programs transmitted in real time.

However, the number of homes with HDR televisions is steadily increasing. In addition, not all HDR televisions have the same dynamic range. Consequently, programs broadcast in HDR are received by televisions which do not necessarily have the necessary rendering capability. In order to address the diversity of televisions, it is possible to generate an SDR program from an HDR program by applying a dynamic range compression algorithm, known as a TMO for "tone mapping operator". Program broadcasting using high-dynamic-range (HDR) technology is subject to a number of constraints. Broadcasting programs in real time, using high-dynamic-range (HDR) technology or otherwise, introduces delay and speed problems. The use of HDR and TMO technologies adds constraints related to video effects (transition effects for example). A classic transition effect is the fade; examples of fades are shown in FIG. 1. The use of a dynamic range compression algorithm, or TMO, attenuates or eliminates fade effects. The attenuation or elimination of fade effects with the use of a TMO dynamic range compression algorithm is due to the rendering of visual details in the standard-dynamic-range content after dynamic range compression. FIG. 2 illustrates the fact that the standard dynamic range is used in full. In FIG. 2, the Y axis for the curves is a percentage and the X axis is in units called "nits" which correspond to one candela per square meter. In FIG. 2, the upper graphs correspond to high-dynamic-range (HDR) brightness levels. The lower graphs correspond to standard-dynamic-range (SDR) brightness levels. The dotted arrows indicate that whatever the HDR brightness range, the entire SDR brightness range is exploited. When video content contains a fade effect, this attenuates the fade effect. FIG. 3 illustrates the effect of a TMO dynamic range compression algorithm on a fade to black. FIG. 3 thus illustrates the attenuation of the fade effect through the use of the TMO dynamic range compression algorithm. The fade effect is not necessarily eliminated. The fade effect may be attenuated and its speed may be altered.

Consequently, the use of a TMO dynamic range compression algorithm alters the rendering of the fade effect in an undesirable manner, regardless of the fade effect (opening/closing fade for example). This therefore constitutes a problem for producers of video content.

The prior art proposes TMO dynamic range compression algorithms that are fast and with a short delay.

However, the TMO dynamic range compression algorithms proposed by the prior art do not provide for dealing with video effects such as transition effects for example. Some methods proposed in the prior art relate to keying effects. A TMO dynamic range compression algorithm method has already been proposed for dealing with fade-type transition effects; however, such a method requires the analysis of a complete sequence. Such a method is therefore not suitable for the broadcasting of video content in real time. Indeed, such a method requires advance knowledge of the position of the start and of the end of each fade effect. Consequently, even in the case that the analysis of the sequence is carried out over a rolling, rather than complete, window, a significant delay results nonetheless. A transition effect (like a fade for example) therefore cannot be preserved without alteration.

There is therefore a need for processing a video stream comprising a set of images that may contain a transition effect.

The present subject disclosure improves the situation.

SUMMARY OF THE INVENTION

To this end, a first aspect of the subject disclosure relates to a method, implemented by computing means, for processing a video stream, the video stream comprising a set of images that may contain a transition effect, the method comprising:

determining whether a fade-type transition effect is detected within the set of images of the video stream,
in a case where the fade-type transition effect is detected within the set of images of the video stream, calculating minimum and maximum brightnesses $L_{MIN}$ and $L_{MAX}$ for each image of the set of images containing the detected transition effect;

estimating minimum and maximum brightnesses $E_{MIN}$ and $E_{MAX}$ for all of the images not containing the detected transition effect;

determining minimum and maximum brightnesses $S_{MIN}$ and $S_{MAX}$ for a standard dynamic range;

calculating minimum and maximum brightnesses $T_{MIN}$ and $T_{MAX}$ depending on the minimum and maximum brightnesses $L_{MIN}$, $L_{MAX}$, $E_{MIN}$, $E_{MAX}$, $S_{MIN}$ and $S_{MAX}$ calculated and determined beforehand;

transmitting the calculated minimum and maximum brightnesses $T_{MIN}$ and $T_{MAX}$ for dynamic range compression.

Thus, the use of the above method for processing a video stream allows content produced in HDR to be downgraded to SDR automatically. This is a low-cost solution in comparison with executing a dual HDR/SDR production. The present subject disclosure is particularly advantageous in the case of broadcasting video content in real time. Indeed, the method for processing a video stream according to the present subject disclosure is a fast method, with a short delay and is capable of preserving fade-type transition effects.

Consequently, the present method for processing a video stream described above is ideally and advantageously applicable to a video stream broadcast in real time. One exemplary application may correspond to broadcasting a sports program in real time.

In one or more embodiments, the proposed method may further comprise: storing the estimated minimum and maximum brightnesses $E_{MIN}$ and $E_{MAX}$ in a circular buffer of parametrizable size.

Thus, estimating the minimum and maximum brightnesses $E_{MIN}$ and $E_{MAX}$ for all of the images of a scene makes it possible to determine the characteristics of this scene. Specifically, $E_{MIN}$ represents the value of the darkest pixel of the scene and $E_{MAX}$ represents the value of the lightest pixel of the scene.

In one or more embodiments, in a case where the fade-type transition effect is not detected within the set of images of the video stream, the method may further comprise:

transmitting the calculated minimum and maximum brightnesses $L_{MIN}$ and $L_{MAX}$ for dynamic range compression.

In one or more embodiments, the proposed method may further comprise: storing the calculated minimum and maximum brightnesses $L_{MIN}$ and $L_{MAX}$ in a circular buffer of parametrizable size.

In one or more embodiments, the calculation of the minimum and maximum brightnesses $T_{MIN}$ and $T_{MAX}$ may be expressed in the following manner:

$$T_{MIN} = S_{MIN} + (L_{MIN} - \min(E_{MIN}, L_{MIN})) * (S_{MAX} - S_{MIN}) / (\min(E_{MAX}, L_{MAX}) - \min(E_{MIN}, L_{MIN})) \text{ and}$$

$$T_{MAX} = S_{MIN} - (L_{MAX} - \min(E_{MIN}, L_{MIN})) * (S_{MAX} - S_{MIN}) / (\min(E_{MAX}, L_{MAX}) - \min(E_{MIN}, L_{MIN}))$$

Thus, determining the brightness interval $[T_{MIN}; T_{MAX}]$ makes it possible to preserve a fade-type transition effect by considering the dynamic range of the scene without fade effect ($[E_{MIN}; E_{MAX}]$), the characteristics of the device used ($[S_{MIN}; S_{MAX}]$) and the brightness range of the images belonging to the fade effect ($[L_{MIN}; L_{MAX}]$).

In one or more embodiments, the calculation of the minimum and maximum brightnesses $T_{MIN}$ and $T_{MAX}$ may be performed in the logarithmic domain.

Indeed, the way humans perceive light is not linear. Likewise, the way in which brightness levels are represented in an HDR television system is not linear. Throughout the video capture, transmission and rendering workflow, numerous conversions and functions are applied to the signal. The proposed method may be applied in several ways:

Direct application (equations above)

Application in another representation domain. The change of representation is achieved by applying a function to all of the brightness values. The method is applied in this new representation domain. The result is converted to the initial representation mode by applying the inverse function. The function may be, for example, a simple logarithm, or else a standard transfer function (SMPTE ST 2084). The function may be (or include) a change of color space. For example, it is possible to convert YUV data to RGB format, apply the method to the three planes R, G and B, and then convert back to YUV.

In one or more embodiments, the estimated brightnesses $E_{MIN}$ and $E_{MAX}$ may be transmitted for dynamic range compression.

In one or more embodiments, the minimum and maximum brightnesses $E_{MIN}$ and $E_{MAX}$ may be multiplied by inversely proportional safety factors f and 1/f, respectively.

Thus, when the fade-type transition effect corresponds to an opening fade, the use of safety factors makes it possible not to underestimate the dynamic range of the scene.

The use of a safety factor on a closing fade is possible, but it is less advantageous because there is less uncertainty as to how the fade ends.

A second aspect of the subject disclosure relates to a computer program comprising instructions for implementing the proposed method according to one or more embodiments of the present subject disclosure, when these instructions are executed by a processor.

A third aspect of the subject disclosure relates to a device for processing a video stream comprising a set of images, the device comprising:

a processor configured to perform the following operations:

determining whether a fade-type transition effect is detected within the set of images of the video stream, in a case where the fade-type transition effect is detected within the set of images of the video stream:

calculating minimum and maximum brightnesses $L_{MIN}$ and $L_{MAX}$ for each image of the set of images containing the detected transition effect;

estimating minimum and maximum brightnesses $E_{MIN}$ and $E_{MAX}$ for all of the images not containing the detected transition effect;

calculating minimum and maximum brightnesses $S_{MIN}$ and $S_{MAX}$ for a standard dynamic range;

calculating minimum and maximum brightnesses $T_{MIN}$ and $T_{MAX}$ depending on the minimum and maximum brightnesses $L_{MIN}$, $L_{MAX}$, $E_{MIN}$, $E_{MAX}$, $S_{MIN}$ and $S_{MAX}$ calculated and determined beforehand;

determining a target dynamic range for a local tone mapping operation depending on the calculated minimum and maximum brightnesses $T_{MIN}$ and $T_{MAX}$;

transmitting the calculated minimum and maximum brightnesses $T_{MIN}$ and $T_{MAX}$ for dynamic range compression.

BRIEF DESCRIPTION OF THE DRAWINGS

Other features and advantages of the present subject disclosure will become apparent from the description below, with reference to the appended drawings which illustrate an exemplary embodiment that is in no way limiting and in which:

FIG. 6 illustrates an exemplary embodiment of the subject disclosure with numerical values;

DESCRIPTION OF THE PREFERRED EMBODIMENTS

Figure 1:
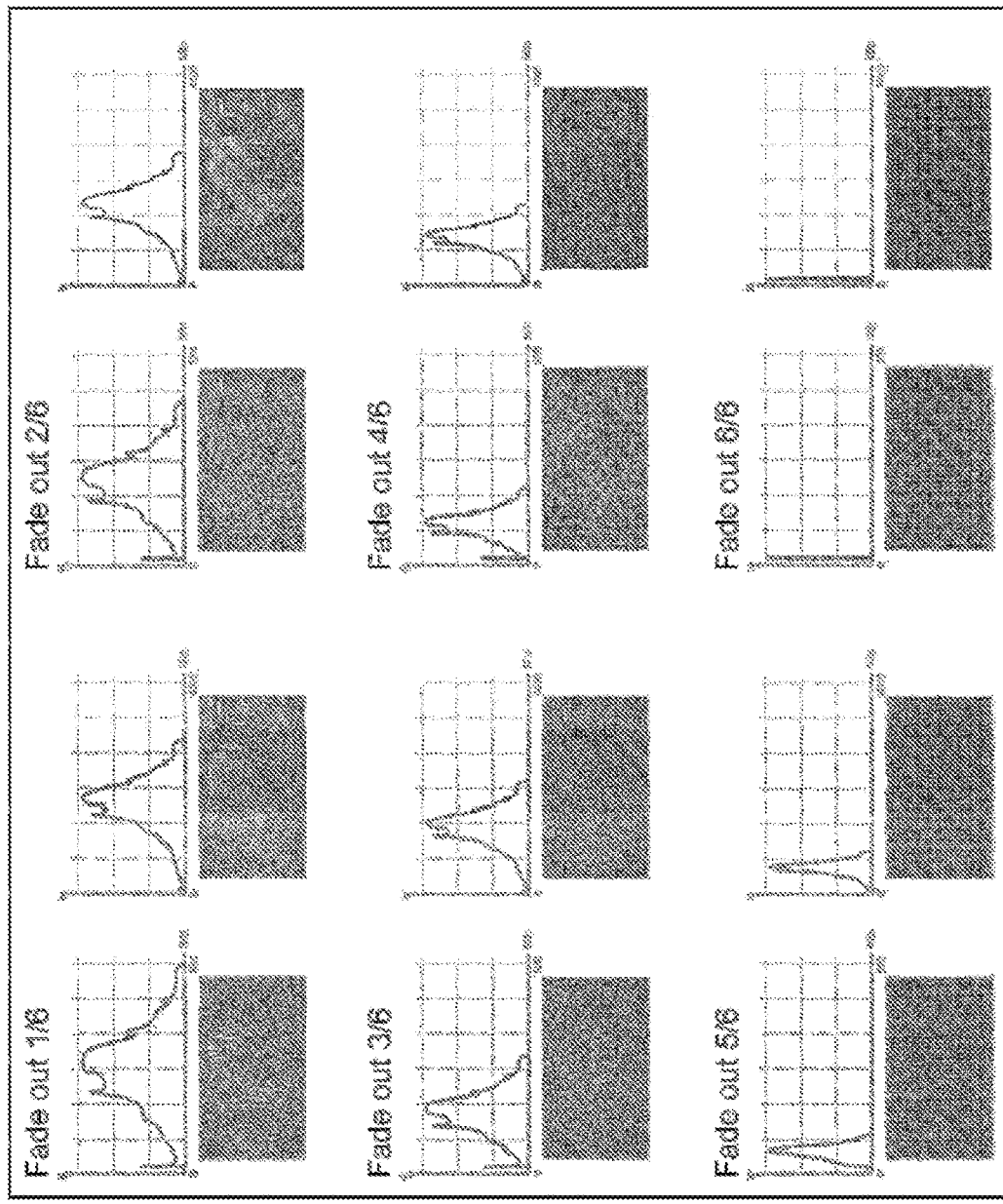
FIG. 1 shows an exemplary transition effect, more particularly a fade effect.
Figure 2:
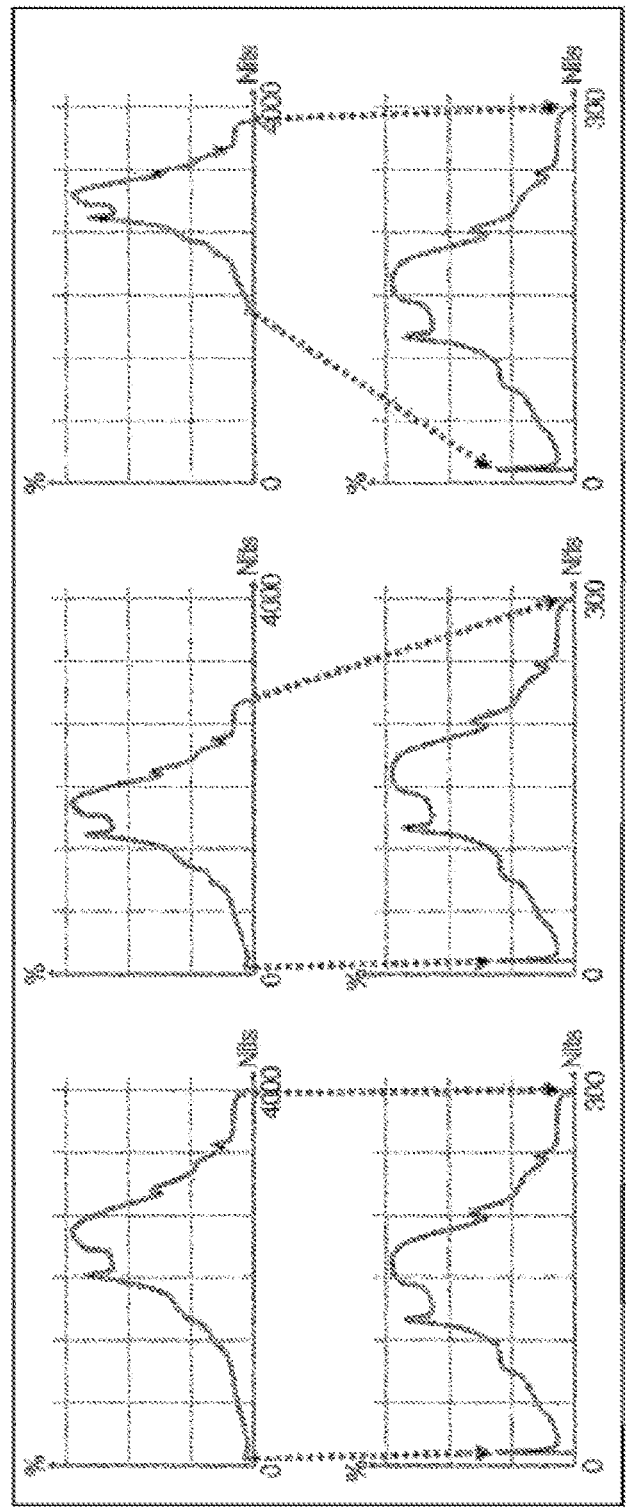
FIG. 2 shows SDR and HDR brightness levels by means of graphs.
Figure 3:
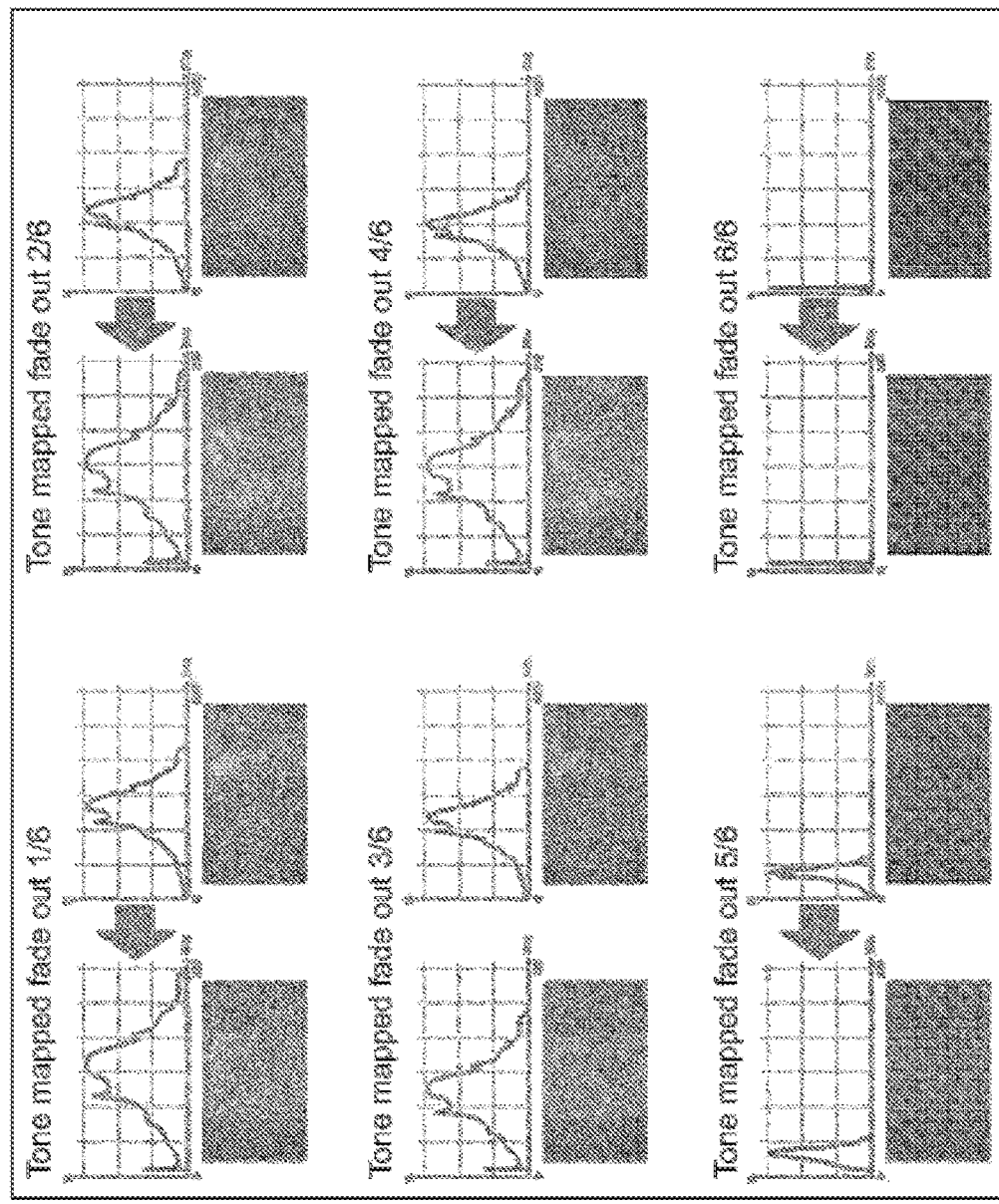
FIG. 3 illustrates the effect of a TMO dynamic range compression algorithm on a fade to black.
Figure 4:
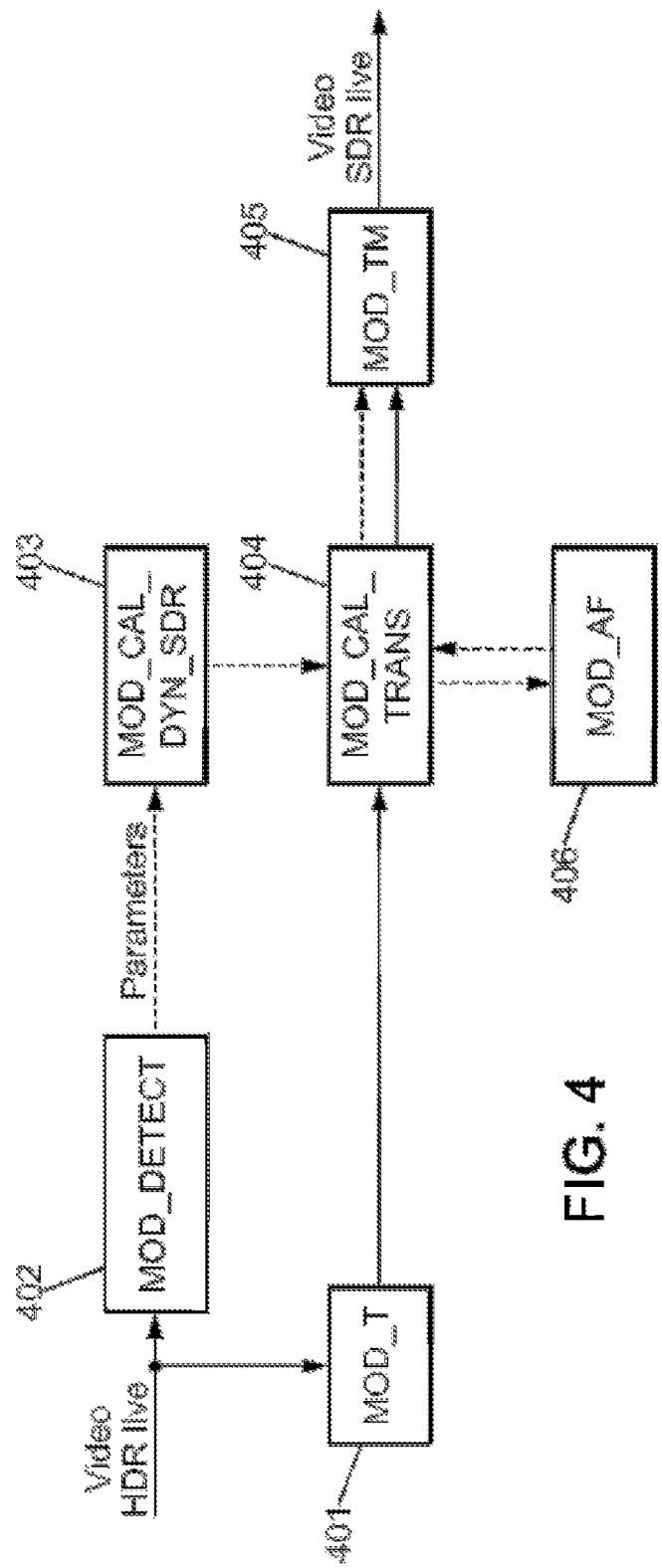
FIG. 4 illustrates an exemplary implementation of the subject disclosure.

FIG. 4 illustrates an exemplary implementation of the subject disclosure. A detection module MOD_DETECT 402 detects, from incoming HDR video content "Video HDR live", a transition effect such as a fade effect for example. The video content "Video HDR live" refers to HDR video content broadcast in real time. In the incoming video content "Video HDR live", the maximum dynamic range and the dynamic range actually used are defined.

The detection module MOD_DETECT 402 which represents a transition effect detection module indicates the probability of being in a transition. It operates with N memory frames, where N is a natural integer greater than or equal to two. The detection module MOD_DETECT 402 makes it possible to extract parameters associated with the detected transition effect.

The parameters associated with the detected transition effect are then transmitted to an SDR dynamic range calculation module represented by MOD_CAL_DYN_SDR 403 in FIG. 4. A transformation calculation module MOD_CAL_TRANS 404 receives as input the parameters from the dynamic range calculation module MOD_CAL_DYN_SDR 403. The transformation calculation module MOD_CAL_TRANS 404 also receives time parameters from a module MOD-T 401. The transformation calculation module MOD_CAL_TRANS 404 exchanges information continuously with a module MOD_AF 406 representing an "anti-flickering" module. The transformation calculation module MOD_CAL_TRANS 404 also exchanges information with a dynamic range compression module MOD_TM 405 representing a "tone mapping" module. Video content "Video SDR live" is output by the dynamic range compression module MOD_TM 405. The video content "Video SDR live" contains the transition effect (fade effect for example) initially detected in the incoming HDR video content "Video HDR live" by the detection module MOD_DETECT 402 which may be linked to a transition effect detection module. The incoming HDR video content "Video HDR live"" has therefore been transformed into outgoing SDR video content "Video SDR live" with the transition effect within the video content being preserved. In addition, as mentioned above, the "live" aspect of the video content refers to a video program being broadcast in real time. Consequently, the exemplary implementation of the subject disclosure represented by FIG. 4 makes it possible, on the basis of HDR video content broadcast in real time comprising, for example, fade-type transitions effects (opening/closing, white/black), to provide SDR video content in real time while preserving these transition effects. The exemplary implementation of the subject disclosure thus makes it possible to preserve transition effects, for example fade-type effects.

FIG. 4 illustrates that the detection module MOD_DETECT 402 supplies the dynamic range calculation module MOD_CAL_DYN_SDR 403 with parameters associated with one or more transition effects detected in the incoming HDR video content. Fade effects have been mentioned as an example of transition effects. Consequently, the parameters of the dynamic calculation module MOD_CAL_DYN_SDR 403 are adjusted depending on the detection or otherwise of transition effects within the incoming HDR video content by the detection module MOD_DETECT 402.

Figure 5:
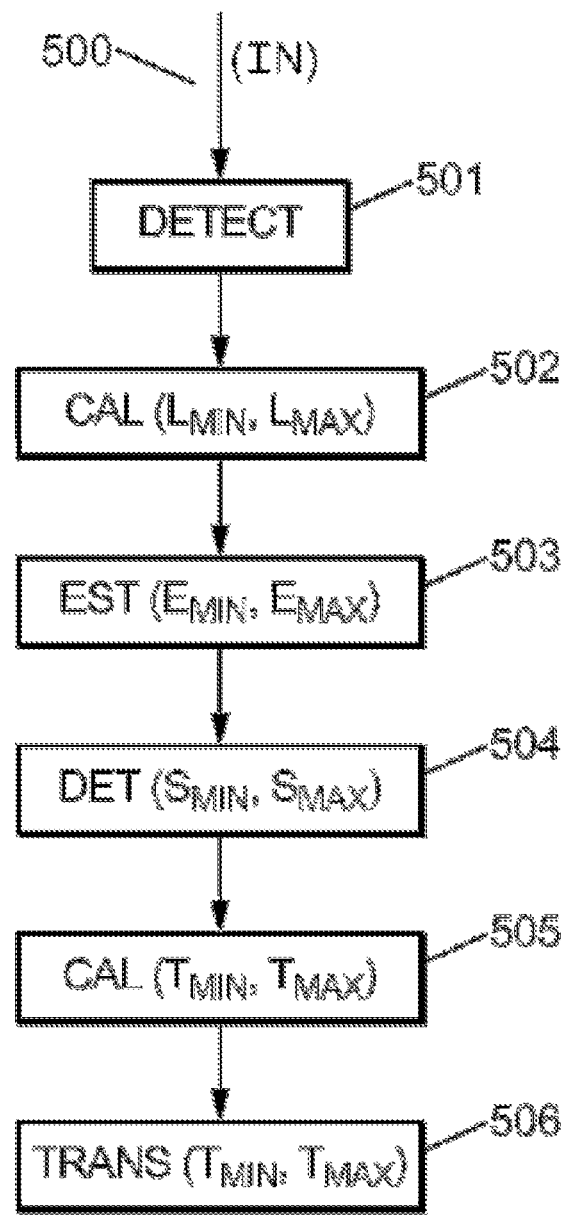
FIG. 5 illustrates an example of the operation of an SDR dynamic range calculation module.

FIG. 5 illustrates an example of the operation of an SDR dynamic range calculation module. A transition effect (for example a fade-type effect) contained within a video stream 500 is detected in act DETECT 501. Where appropriate, i.e. if a fade effect was detected in act DETECT 501, minimum and maximum brightnesses $L_{MIN}$ and $L_{MAX}$ are calculated in a act CAL ($L_{MIN}$, $L_{MAX}$) 502 for each image of the set of images containing the fade effect. Minimum and maximum brightnesses $E_{MIN}$ and $E_{MAX}$ are estimated for all of the images not containing the detected fade effect in act EST ($E_{MIN}$, $E_{MAX}$) 503. Minimum and maximum brightnesses $S_{MIN}$ and $S_{MAX}$ are determined for a standard dynamic range in act DET ($S_{MIN}$, $S_{MAX}$) 504. The minimum and maximum brightnesses $S_{MIN}$ and $S_{MAX}$ represent fixed parameters. $S_{MIN}$ and $S_{MAX}$ are determined in act DET ($S_{MIN}$, $S_{MAX}$) 504 and are not necessarily recalculated for each image. Minimum and maximum brightnesses $T_{MIN}$ and $T_{MAX}$ are finally calculated according to the minimum and maximum brightnesses $L_{MIN}$, $L_{MAX}$, $E_{MIN}$, $E_{MAX}$, $S_{MIN}$ and $S_{MAX}$ calculated and determined beforehand in a calculation act CAL ($T_{MIN}$, $T_{MAX}$) 505. The minimum and maximum brightnesses $T_{MIN}$ and $T_{MAX}$ thus calculated in act CAL ($T_{MIN}$, $T_{MAX}$) 505 are next transmitted for dynamic range compression in a transmission act TRANS ($T_{MIN}$, $T_{MAX}$) 506. Act DETECT 501 may be performed by the detection module MOD_DETECT 402 of FIG. 4. Acts 502 to 505 (calculation, estimation and determination) may be performed by the dynamic range calculation module MOD_CAL_DYN_SDR 403 of FIG. 4. Regarding transmission act TRANS ($T_{MIN}$, $T_{MAX}$) 506, it may be performed by the transformation calculation module MOD_CAL_TRANS 404 and the dynamic range compression module MOD_TM 405 of FIG. 4.

Besides estimating the maximum brightness of a scene, in the case of a detected transition effect, the SDR dynamic range calculation module makes it possible to preserve, in the destination, the relationship between actual dynamic range and maximum dynamic range of the scene. Additionally, in the case of a transition effect corresponding to an opening fade effect, the estimate of the maximum brightness is refined with each image.

The SDR dynamic range calculation module is a key element of the present subject disclosure. Consequently, the processing of an I-frame at a time t will be described in detail:

When the I-frame is not included in a fade-type transition effect:
  The minimum and maximum brightnesses of the I-frame, $L_{MIN}$ and $L_{MAX}$, are calculated. $L_{MIN}$ and $L_{MAX}$ are next stored in a circular buffer B of parametrizable size. The size of the circular buffer B may for example be one second. The circular buffer B is reset with each change of scene.

$L_{MIN}$ and $L_{MAX}$ are next provided for dynamic range compression.

When the I-frame is included in a fade-type transition effect (for example a closing fade, from the image to black):

The minimum and maximum brightnesses of the I-frame, $L_{MIN}$ and $L_{MAX}$, are calculated. However, the brightnesses $L_{MIN}$ and $L_{MAX}$ are not stored in the circular buffer B.

The minimum and maximum brightnesses of all of the images not containing the fade effect $E_{MIN}$ and $E_{MAX}$ are estimated for example by averaging the minimum and maximum brightnesses stored in the circular buffer B. Another solution may consist in taking the last calculated value present in the circular buffer B. It is also possible to take values set a priori.

The minimum and maximum brightnesses $S_{MIN}$ and $S_{MAX}$ corresponding to the SDR dynamic range are set by the characteristics of the device used, so $S_{MIN}$ and $S_{MAX}$ are known a priori.

The minimum and maximum brightnesses $T_{MIN}$ and $T_{MAX}$ define the target dynamic range for dynamic range compression. The calculation of the brightnesses $T_{MIN}$ and $T_{MAX}$ may be expressed in the following manner:

$$T_{MIN}=S_{MIN}+(L_{MIN}-\min(E_{MIN},L_{MIN}))*(S_{MAX}-S_{MIN})/(\min(E_{MAX},L_{MAX})-\min(E_{MIN},L_{MIN})) \text{ and}$$

$$T_{MAX}=S_{MIN}+(L_{MAX}-\min(E_{MIN},L_{MIN}))*(S_{MAX}-S_{MIN})/(\min(E_{MAX},L_{MAX})-\min(E_{MIN},L_{MIN}))$$

The calculation of the brightnesses $T_{MIN}$ and $T_{MAX}$ may also be performed in the logarithmic domain.

The values of the brightnesses $T_{MIN}$ and $T_{MAX}$ are taken into account as destination dynamic range, thus replacing the values of the brightnesses $S_{MIN}$ and $S_{MAX}$. Equivalently, it may be considered that the values of the brightnesses $E_{MIN}$ and $E_{MAX}$ are taken into account as source dynamic range, thus replacing the values of the brightnesses $L_{MIN}$ and $L_{MAX}$.

The above example corresponds to a closing fade-type transition effect. In the case of an opening fade effect (for example from white to the image), certain acts or operations mentioned above may be modified. Specifically, the values of the brightnesses $E_{MIN}$ and $E_{MAX}$ stored in the circular buffer B are not necessarily reliable. This is due to the fact that an opening fade effect indicates the start of a new scene. Therefore, in order not to underestimate the dynamic range of the scene at the end of the fade effect, the brightnesess $E_{MIN}$ and $E_{MAX}$ may be multiplied by a safety factor "f" and "1/f", respectively. By way of indication, a value of f=1.5 may be used.

An alternative solution may also consist in estimating the brightnesses $E_{MIN}$ and $E_{MAX}$ from the brightnesses $L_{MIN}$ and $L_{MAX}$ and the parameters corresponding to the fade effect. For this, an assumption on the duration of the fade effect may be made.

The brightnesses thus previously calculated, estimated and determined are in the linear domain. Appropriate conversions such as those defined for example in "ITU-R Recommendation BT.709" for SDR or "ITU-R Recommendation BT.2100" for HDR should be applied appropriately. It is recalled that SDR refers to standard-dynamic-range technology. HDR refers to high-dynamic-range technology.

Figure 6:
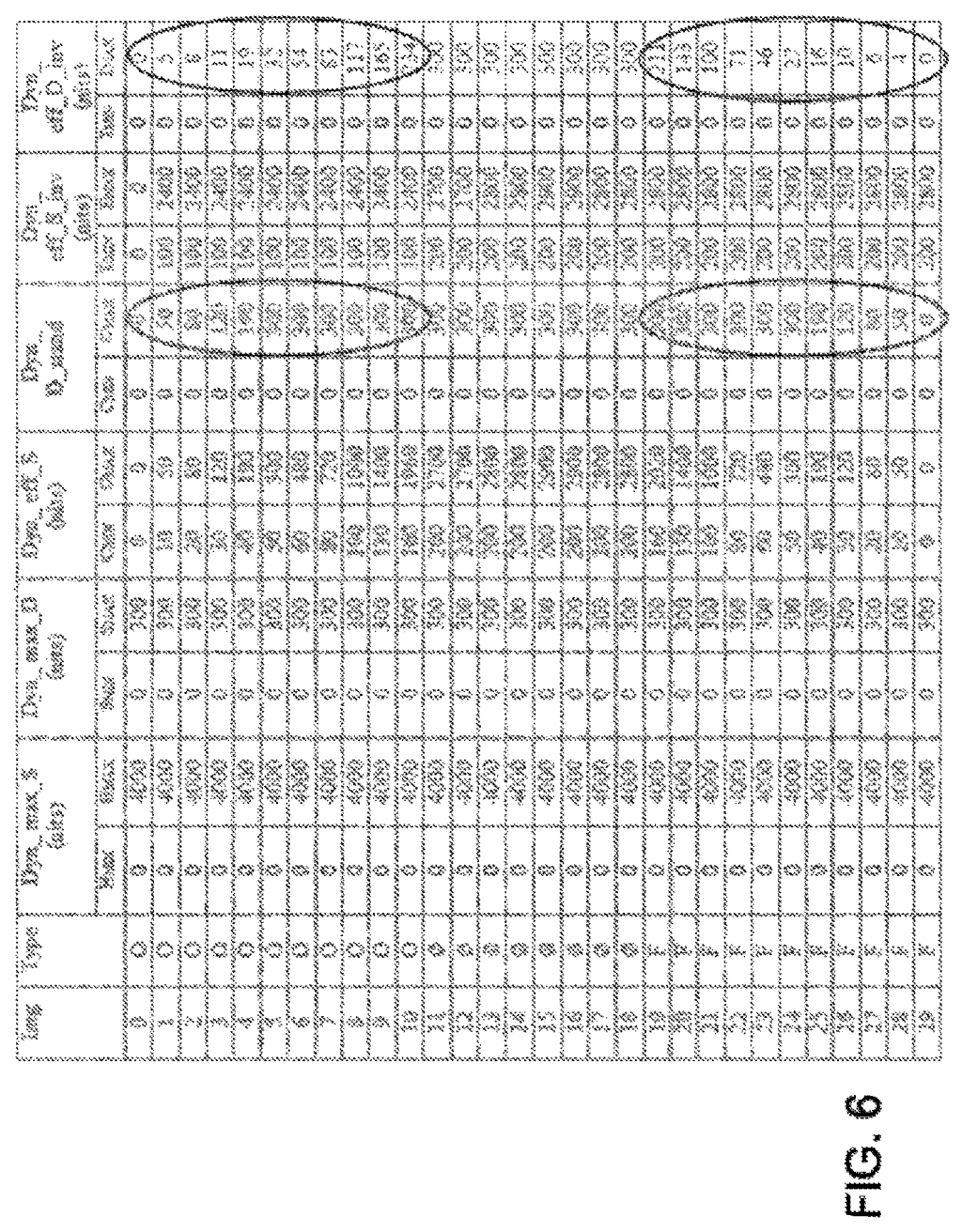

FIG. 6 illustrates an exemplary embodiment of the subject disclosure with numerical values. The various columns of the table in FIG. 6 correspond to, respectively (from left to right): image number (Img), fade type (Type), maximum dynamic range of the source (Dyn_max_S), maximum dynamic range of the destination (Dyn_max_D), actual dynamic range of the source (Dyn_eff_S), dynamic range of the destination calculated according to a conventional method (Dyn_D_stand), actual dynamic range of the source calculated according to the subject disclosure (Dyn_eff_S_inv) and actual dynamic range of the destination calculated according to the subject disclosure (Dyn_eff_D_inv). Regarding the columns of the table in FIG. 6, opening fades are denoted by "O" and the closing fades by "F". When there is no fade effect, the empty set symbol Ø is used for the table in FIG. 6.

In this exemplary embodiment of the subject disclosure, the transition effects detected are, for example, opening or closing fade-type transition effects. An opening fade may correspond for example to a transition from white to the image; this represents a classic transition effect in the broadcast of a television program. A closing fade corresponds for example to a final scene in the broadcast of a television program.

The brightnesses $H_{MIN}$ and $H_{MAX}$ correspond to the maximum possible dynamic range of the source, i.e. of the incoming video stream such as represented by the exemplary video stream "Video HDR live" in FIG. 4 for example. For an opening fade-type transition effect, minimum and maximum brightnesses $L_{MIN}$ and $L_{MAX}$ are calculated (such as indicated for example in FIG. 5). The brightnesses $L_{MIN}$ and $L_{MAX}$ correspond, respectively, to the minimum and maximum of the brightness range for each image included within the set of images containing the opening fade effect. For an opening-type fade, the information corresponding to the minimum and maximum brightnesses for all of the images not containing the opening fade is not available. Therefore, the minimum and maximum brightnesses $E_{MIN}$ and $E_{MAX}$ for all of the images not containing the opening-type fade are set beforehand, which is not the case for a closing-type fade. Minimum and maximum brightnesses $S_{MIN}$ and $S_{MAX}$ are determined for a standard dynamic range. These minimum and maximum brightness values $S_{MIN}$ and $S_{MAX}$ are fixed values dependent on the type of device used (for example the type of television set used by a user). The calculation of the minimum and maximum brightnesses $T_{MIN}$ and $T_{MAX}$ according to the minimum and maximum brightnesses $L_{MIN}$, $L_{MAX}$, $E_{MIN}$, $E_{MAX}$, $S_{MIN}$ and $S_{MAX}$ may be performed in the following manner:

$$T_{MIN}=S_{MIN}+(L_{MIN}-\min(E_{MIN},L_{MIN}))*(S_{MAX}-S_{MIN})/(\min(E_{MAX},L_{MAX})-\min(E_{MIN},L_{MIN})) \text{ and}$$

$$T_{MAX}=S_{MIN}+(L_{MAX}-\min(E_{MIN},L_{MIN}))*(S_{MAX}-S_{MIN})/(\min(E_{MAX},L_{MAX})-\min(E_{MIN},L_{MIN}))$$

The actual dynamic range of the destination calculated according to an exemplary embodiment of the subject disclosure is represented by the interval [$T_{MIN}$: $T_{MAX}$]. This interval represents a range of values in nits corresponding to the SI unit of brightness (equivalent to a value of one candela per square meter). The interval [$C_{MIN}$: $C_{MAX}$] shown in FIG. 6 corresponds to an exemplary calculation of the destination dynamic range according to a conventional method of the prior art. The circled values of $C_{MAX}$ and $T_{MAX}$ in FIG. 6 allow the advantage of the present subject disclosure to be highlighted. Specifically, it is found that the (opening or closing) fade effect is preserved by virtue of the present subject disclosure.

Figure 7:
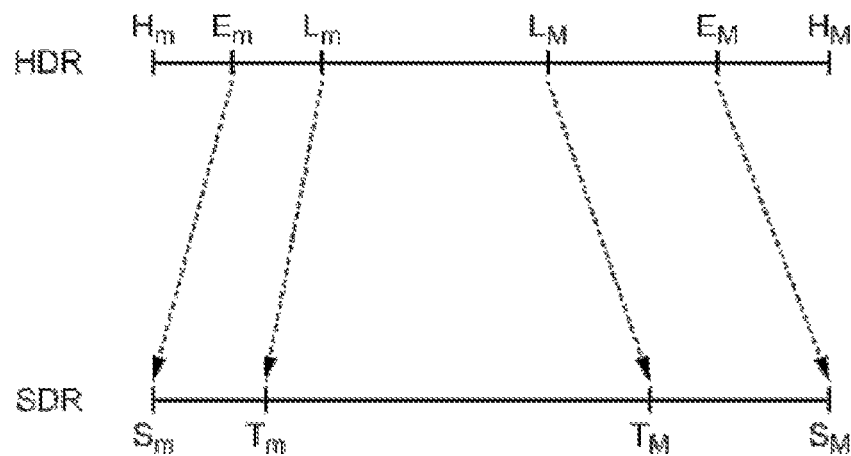
FIG. 7 shows an example of dynamic range conversion taking into account the dynamic range of a scene outside of a fade effect.

FIG. 7 shows an example of dynamic range conversion taking into account the dynamic range of a scene outside of a fade effect. When in a fade-type effect, the dynamic range is decreased with respect to the source, i.e. to the dynamic range of a scene. Thus, the brightness interval [$E_{MIN}$: $E_{MAX}$] of FIG. 7 represents the dynamic range of a scene without fade-type transition effects. $E_{MIN}$ therefore represents the value of the darkest pixel and $E_{MAX}$ represents the value of the lightest pixel when there is no fade-type transition effect. Estimating the brightness interval [$E_{MIN}$: $E_{MAX}$] therefore makes it possible to determine the characteristics of a scene. When in the presence of a fade-type transition effect, the brightness range is decreased for a closing fade. In the case of an opening fade, the brightness range increases. The example of FIG. 5 corresponds to an exemplary closing fade-type transition effect. Specifically, the brightness interval [$E_{MIN}$: $E_{MAX}$] is decreased to correspond to the brightness interval [$L_{MIN}$: $L_{MAX}$]. Consequently, outside of a fade effect, the pixels take brightness values belonging to the interval [$E_{MIN}$: $E_{MAX}$]. For an image located inside the fade effect, the pixels take values located in the brightness interval [$L_{MIN}$: $L_{MAX}$]. The brightness interval [$S_{MIN}$: $S_{MAX}$] corresponds to a fixed interval which is not calculated, dependent on the device used. In the same way [$H_{MIN}$: $H_{MAX}$] are not calculated values but fixed values known a priori. [$H_{MIN}$: $H_{MAX}$] corresponds to an HDR dynamic range and [$S_{MIN}$: $S_{MAX}$] corresponds to an SDR dynamic range. For example, the interval [$S_{MIN}$: $S_{MAX}$] may correspond to the characteristics of a television set.

In the case of standard dynamic range compression or standard "tone mapping", the dynamic range [$L_{MIN}$: $L_{MAX}$] is projected onto the entire SDR dynamic range, i.e. [$S_{MIN}$: $S_{MAX}$]. Consequently, a fade effect is not preserved.

However, in the case of the present subject disclosure, the dynamic range [$L_{MIN}$: $L_{MAX}$] is projected onto a dynamic range that is smaller than the SDR dynamic range in order to preserve a fade-type effect. Consequently, in FIG. 7, it may be seen that [$E_{MIN}$: $E_{MAX}$] is projected onto [$S_{MIN}$: $S_{MAX}$] and [$L_{MIN}$: $L_{MAX}$] is projected onto [$T_{MIN}$: $T_{MAX}$], brightness interval determined by the present subject disclosure. The fade effect is thus preserved. The values represented by [$T_{MIN}$: $T_{MAX}$] are an example of the result provided by the subject disclosure. These values of [$T_{MIN}$: $T_{MAX}$] are delivered to the "tone mapping" (dynamic range compression) operation, which then takes them into account.

Figure 8:
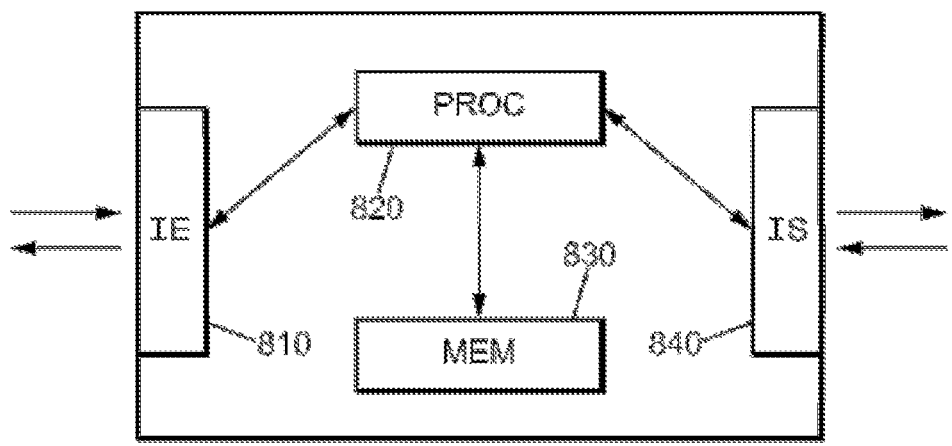
FIG. 8 illustrates a device according to an exemplary embodiment of the subject disclosure.

The subject disclosure may be implemented by a computing device, such as illustrated by way of example in FIG. 8, which comprises a processing circuit including:
  an input interface 810 for receiving the image data to be processed,
  a processor 820 cooperating with a memory 830, for processing the received image data, and
  an output interface 840 for delivering the image data processed by implementing the above method.

The aforementioned memory 830 can typically store instruction code for the computer program of the subject disclosure (an exemplary flowchart of which is presented in FIG. 5 discussed above). This instruction code can be read by the processor 820 in order to carry out the method according to the subject disclosure. The device may also include a working memory (distinct from or identical to the memory 830) for storing temporary data.

The subject disclosure is not limited to the exemplary embodiments described above, only by way of example, but rather it encompasses all of the variants that a person skilled in the art might envisage within the scope of the claims below.

The invention claimed is:
1. A method, implemented by computing means, for processing a video stream comprising a set of images, the method comprising:
  detecting a fade-type transition effect within the set of images of the video stream to obtain a first subset of images containing the fade-type transition effect;
  calculating minimum and maximum brightnesses $L_{MIN}$ and $L_{MAX}$ for each image of the first subset of images containing the fade-type transition effect;
  estimating minimum and maximum brightnesses $E_{MIN}$ and $E_{MAX}$ for a second subset of images not containing the detected fade-type transition effect;
  determining minimum and maximum brightnesses $S_{MIN}$ and $S_{MAX}$ for a standard dynamic range;
  calculating minimum and maximum brightnesses $T_{MIN}$ and $T_{MAX}$ depending on the minimum and maximum brightnesses $L_{MIN}$, $L_{MAX}$, $E_{MIN}$, $E_{MAX}$, $S_{MIN}$ and $S_{MAX}$ calculated and determined beforehand; and
  transmitting the calculated minimum and maximum brightnesses $T_{MIN}$ and $T_{MAX}$ for dynamic range compression.

2. The method according to claim 1, wherein the estimating the minimum and maximum brightnesses $E_{MIN}$ and $E_{MAX}$ for all of the images is followed by storing these brightnesses $E_{MIN}$ and $E_{MAX}$ in a circular buffer of parametrizable size.

3. The method according to claim 1, wherein in a case where the fade-type transition effect is not detected within the set of images of the video stream, the method further comprises:
  transmitting the calculated minimum and maximum brightnesses $L_{MIN}$ and $L_{MAX}$ for dynamic range compression.

4. The method according to claim 3, further comprising: storing the calculated minimum and maximum brightnesses $L_{MIN}$ and $L_{MAX}$ in a circular buffer of parametrizable size.

5. The method according to claim 1, wherein the calculation of the minimum and maximum brightnesses $T_{MIN}$ and $T_{MAX}$ is expressed in the following manner:

$$T_{MIN} = S_{MIN} + (L_{MIN} - \min(E_{MIN}, L_{MIN})) * (S_{MAX} - S_{MIN}) / (\min(E_{MAX}, L_{MAX}) - \min(E_{MIN}, L_{MIN})) \text{ and}$$

$$T_{MAX} = S_{MIN} + (L_{MAX} - \min(E_{MIN}, L_{MIN})) * (S_{MAX} - S_{MIN}) / (\min(E_{MAX}, L_{MAX}) - \min(E_{MIN}, L_{MIN})).$$

6. The method according to claim 1, wherein the calculation of the minimum and maximum brightnesses $T_{MIN}$ and $T_{MAX}$ is performed in the logarithmic domain.

7. The method according to claim 1, wherein the estimated brightnesses $E_{MIN}$ and $E_{MAX}$ are transmitted for dynamic range compression.

8. The method according to claim 1, wherein the minimum and maximum brightnesses $E_{MIN}$ and $E_{MAX}$ are multiplied by inversely proportional safety factors f and 1/f, respectively.

9. A device for processing a video stream comprising a set of images, the device comprising:
  a processor configured to perform the following operations:
  detecting a fade-type transition effect within the set of images of the video stream to obtain a first subset of images containing the fade-type transition effect;
  calculating minimum and maximum brightnesses $L_{MIN}$ and $L_{MAX}$ for each image of the first subset of images containing the detected fade-type transition effect;
  estimating minimum and maximum brightnesses $E_{MIN}$ and $E_{MAX}$ for a second subset of images not containing the detected fade-type transition effect;

calculating minimum and maximum brightnesses $S_{MIN}$ and $S_{MAX}$ for a standard dynamic range;

calculating minimum and maximum brightnesses $T_{MIN}$ and $T_{MAX}$ depending on the minimum and maximum brightnesses $L_{MIN}$, $L_{MAX}$, $E_{MIN}$, $E_{MAX}$, $S_{MIN}$ and $S_{MAX}$ calculated and determined beforehand;

determining a target dynamic range for a local tone mapping operation depending on the calculated minimum and maximum brightnesses $T_{MIN}$ and $T_{MAX}$; and transmitting the calculated minimum and maximum brightnesses $T_{MIN}$ and $T_{MAX}$ for dynamic range compression.

10. The device according to claim 9, wherein the estimating the minimum and maximum brightnesses $E_{MIN}$ and $E_{MAX}$ for all of the second subset of images is followed by storing these brightnesses $E_{MIN}$ and $E_{MAX}$ in a circular buffer of parametrizable size.

11. The device according to claim 9, wherein the processor is further configured to perform the following operations: in a case where a fade-type transition effect is not detected within the set of images of the video stream, transmitting the calculated minimum and maximum brightnesses $L_{MIN}$ and $L_{MAX}$ for dynamic range compression.

12. The device according to claim 9, wherein the calculating the minimum and maximum brightnesses $L_{MIN}$ and $L_{MAX}$ is followed by storing these brightnesses $L_{MIN}$ and $L_{MAX}$ in a circular buffer of parametrizable size.

13. The device according to claim 9, wherein the calculation of the minimum and maximum brightnesses $T_{MIN}$ and $T_{MAX}$ is expressed in the following manner:

$$T_{MIN}=S_{MIN}+(L_{MIN}-\min(E_{MIN},L_{MIN}))*(S_{MAX}-S_{MIN})/(\min(E_{MAX},L_{MAX})-\min(E_{MIN},L_{MIN})) \text{ and}$$

$$T_{MAX}=S_{MIN}+(L_{MAX}-\min(E_{MIN},L_{MIN}))*(S_{MAX}-S_{MIN})/(\min(E_{MAX},L_{MAX})-\min(E_{MIN},L_{MIN})).$$

14. The device according to claim 9, wherein the calculation of the minimum and maximum brightnesses $T_{MIN}$ and $T_{MAX}$ is performed in the logarithmic domain.

15. The device according to claim 9, wherein the estimated brightnesses $E_{MIN}$ and $E_{MAX}$ are transmitted for dynamic range compression.

16. The device according to claim 9, wherein the minimum and maximum brightnesses $E_{MIN}$ and $E_{MAX}$ are multiplied by inversely proportional safety factors f and 1/f, respectively.

17. A non-transitory computer-readable medium encoded with executable instructions which, when executed, causes an apparatus comprising a processor operatively coupled with a memory, to perform a method for processing a video stream comprising a set of images, the method comprising:

detecting a fade-type transition effect within the set of images of the video stream to obtain a first subset of images containing the fade-type transition effect;

calculating minimum and maximum brightnesses $L_{MIN}$ and $L_{MAX}$ for each image of the first subset of images containing the fade-type transition effect;

estimating minimum and maximum brightnesses $E_{MIN}$ and $E_{MAX}$ for a second subset of images not containing the detected fade-type transition effect;

determining minimum and maximum brightnesses $S_{MIN}$ and $S_{MAX}$ for a standard dynamic range;

calculating minimum and maximum brightnesses $T_{MIN}$ and $T_{MAX}$ depending on the minimum and maximum brightnesses $L_{MIN}$, $L_{MAX}$, $E_{MIN}$, $E_{MAX}$, $S_{MIN}$ and $S_{MAX}$ calculated and determined beforehand; and transmitting the calculated minimum and maximum brightnesses $T_{MIN}$ and $T_{MAX}$ for dynamic range compression.

18. The non-transitory computer-readable medium according to claim 17, wherein the estimating the minimum and maximum brightnesses $E_{MIN}$ and $E_{MAX}$ for all of the images is followed by storing these brightnesses $E_{MIN}$ and $E_{MAX}$ in a circular buffer of parametrizable size.

19. The non-transitory computer-readable medium according to claim 17, wherein the processor is further configured to perform the following operations: in a case where a fade-type transition effect is not detected within the set of images of the video stream, transmitting the calculated minimum and maximum brightnesses $L_{MIN}$ and $L_{MAX}$ for dynamic range compression.

20. The non-transitory computer-readable medium according to claim 17, wherein the calculating the minimum and maximum brightnesses $L_{MIN}$ and $L_{MAX}$ is followed by storing these brightnesses $L_{MIN}$ and $L_{MAX}$ in a circular buffer of parametrizable size.

\* \* \* \* \*